(12) United States Patent
Fukuyama et al.

(10) Patent No.: US 9,347,366 B2
(45) Date of Patent: May 24, 2016

(54) TWO-STROKE ENGINE AND FOUR-STROKE ENGINE

(75) Inventors: Masahisa Fukuyama, Osaka (JP); Kenji Ishiguro, Osaka (JP); Naohiro Murata, Osaka (JP)

(73) Assignee: HITACHI ZOSEN CORPORATION (JP)

( * ) Notice: Subject to any disclaimer, the term of this patent is extended or adjusted under 35 U.S.C. 154(b) by 141 days.

(21) Appl. No.: 13/978,735

(22) PCT Filed: Dec. 26, 2011

(86) PCT No.: PCT/JP2011/080043
§ 371 (c)(1),
(2), (4) Date: Jul. 9, 2013

(87) PCT Pub. No.: WO2012/096123
PCT Pub. Date: Jul. 19, 2012

(65) Prior Publication Data
US 2013/0291841 A1    Nov. 7, 2013

(30) Foreign Application Priority Data
Jan. 11, 2011 (JP) .............................. P2011-002824

(51) Int. Cl.
*F02B 33/44* (2006.01)
*F02M 25/07* (2006.01)
(Continued)

(52) U.S. Cl.
CPC ................ *F02B 33/00* (2013.01); *F02B 25/04* (2013.01); *F02M 21/0206* (2013.01);
(Continued)

(58) Field of Classification Search
CPC ...... F02B 25/04; F02B 33/00; F02B 21/0206; F02M 25/0709

USPC ..................... 60/605.1, 605.2, 280, 286, 278; 123/575, 568.11
See application file for complete search history.

(56) References Cited

U.S. PATENT DOCUMENTS

| | | | | |
|---|---|---|---|---|
| 5,657,630 A | * | 8/1997 | Kjemtrup | F02B 47/02 123/25 G |
| 2003/0110761 A1 | * | 6/2003 | Minami | B01D 53/9431 60/280 |

(Continued)

FOREIGN PATENT DOCUMENTS

| | | |
|---|---|---|
| CN | 101035976 A | 9/2007 |
| CN | 201679603 U | 12/2010 |

(Continued)

OTHER PUBLICATIONS

AnEnglish machine translation of DE102005057207 A1, published on Jun. 6, 2007.*

(Continued)

*Primary Examiner* — Thai Ba Trieu
*Assistant Examiner* — Deming Wan
(74) *Attorney, Agent, or Firm* — Ostrolenk Faber LLP

(57) ABSTRACT

An exhaust gas exhausted from a combustion chamber of a two-stroke engine is fed to a turbine of a supercharger. Part of the exhaust gas that has passed through the turbine is extracted as an EGR gas by an exhaust gas recirculation part. The EGR gas is cooled by the heat of vaporization of liquid ammonia ejected from an ammonia ejection part, circulated into a suction gas in a suction path, pressurized by a compressor, and supplied as a scavenging gas into the combustion chamber. This recirculation of the exhaust gas can reduce the amount of nitrogen oxide exhausted from the two-stroke engine into the ambient air. Ejecting the liquid ammonia toward the EGR gas in a recirculation path facilitates cooling of the EGR gas, which is required for circulating the EGR gas into the suction gas.

10 Claims, 3 Drawing Sheets

(51) Int. Cl.
*F02M 25/06* (2006.01)
*F01N 5/04* (2006.01)
*F01N 3/00* (2006.01)
*F02B 33/00* (2006.01)
*F02B 25/04* (2006.01)
*F02M 21/02* (2006.01)
*F02B 37/00* (2006.01)
*F02B 29/04* (2006.01)

(52) U.S. Cl.
CPC ...... *F02M 25/0709* (2013.01); *F02M 25/0742* (2013.01); *F02B 29/0406* (2013.01); *F02B 37/00* (2013.01); *F02M 21/0275* (2013.01); *F02M 25/071* (2013.01); *Y02T 10/121* (2013.01); *Y02T 10/32* (2013.01)

(56) References Cited

U.S. PATENT DOCUMENTS

| | | | |
|---|---|---|---|
| 2008/0177457 A1 | 7/2008 | Ishikawa et al. | 701/103 |
| 2008/0223036 A1* | 9/2008 | Hara et al. | 60/601 |
| 2010/0242928 A1* | 9/2010 | Fasold et al. | 123/568.12 |
| 2010/0288249 A1* | 11/2010 | Sasaki et al. | 123/575 |
| 2011/0265463 A1 | 11/2011 | Kojima et al. | 60/229 |

FOREIGN PATENT DOCUMENTS

| | | | | |
|---|---|---|---|---|
| DE | 10357402 A1 * | 9/2003 | | F01N 3/08 |
| DE | 102005057207 A1 * | 6/2007 | | F02M 25/07 |
| EP | 0 527 362 | | 2/1993 | |
| EP | 0 787 900 | | 8/1997 | |
| EP | 2 168 661 | | 3/2010 | |
| JP | 55-104513 | | 8/1980 | |
| JP | 63-186936 | | 11/1988 | |
| JP | 5-13959 Y2 | | 4/1993 | |
| JP | 5-195801 | | 8/1993 | |
| JP | 2009-085011 | | 4/2009 | |
| JP | 2010-159705 | | 7/2010 | |
| JP | 2010-196551 | | 9/2010 | |
| WO | WO 2009/081227 | | 7/2009 | |

OTHER PUBLICATIONS

Machine translation of JP 2010-196551A, published on Sep. 9, 2010.*

Extended European Search Report issued on May 27, 2014 corresponding to European Patent Application No. 11 855 282.7.

English translation of European Patent Application No. 527362 filed Feb. 17, 1993 (8 pages).

PCT/IB/326 Notification Concerning Transmittal of International Preliminary Report on Patentability including PCT/IB/373 and PCT/ISA/237 corresponding to PCT/JP2011/080043 in Japanese, Jul. 2013, (5 pages).

PCT/IB/338 Notification of Transmittal of Translation of the International Preliminary Report on Patentability including PCT/IB/373 and PCT ISA/237 corresponding to PCT/JP2011/080043 in English, Jul. 2013, (6 pages).

* cited by examiner

TWO-STROKE ENGINE AND FOUR-STROKE ENGINE

CROSS-REFERENCE TO RELATED APPLICATIONS

The present application is a 35 U.S.C. §§371 national phase conversion of PCT/JP2011/080043, filed Dec. 26, 2011, which claims priority to Japanese Patent Application No. P2011-002824, filed Jan. 11, 2011, the contents of which are incorporated herein by reference. The PCT International Application was published in the Japanese language.

TECHNICAL FIELD

The present invention relates to an engine including an exhaust gas recirculation part.

BACKGROUND ART

In recent years, automotive four-stroke engines use an exhaust gas recirculation (EGR) apparatus in which the amount of nitrogen oxide ($NO_X$) in an exhaust gas exhausted into an exhaust system is reduced by circulating part of the exhaust gas (hereinafter, "EGR gas") into a suction system. With engines having the exhaust gas recirculation apparatus, there is a risk that metal parts of the suction system may corrode due to the sulfur (S) content in the EGR gas reacting with water vapor in the suction system and causing the suction gas to become acidic. In Japanese Patent Application Laid-Open No. 2009-85011 (Document 1), part of exhaust gas after passing through a catalytic apparatus provided in the exhaust system is circulated as an EGR gas into the suction system. The EGR gas contains ammonia ($NH_3$) gas generated by the catalytic apparatus reducing nitrogen oxide, and can thus neutralize the acidic suction gas and suppress corrosion of the metal parts of the suction system.

The apparatus of Document 1 needs to cool the high-temperature EGR gas in order to circulate the EGR gas into the suction system. In view of this, an EGR cooler for cooling the EGR gas is provided on an exhaust gas circulation path that connects a suction gas pipe and an exhaust pipe and allows the EGR gas to be recirculated into the suction system. It is, however, desirable to reduce the size of the EGR cooler because various devices including components of the engine are disposed in an engine room.

SUMMARY OF INVENTION

The present invention has been achieved in light of the above-described problems, and it is an object of the present invention to reduce the amount of nitrogen oxide by recirculation of an exhaust gas and to facilitate cooling that is necessary for circulating an EGR gas.

A preferable two-stroke engine according to the present invention includes a cylinder, a piston provided in the cylinder, a supercharger for pressurizing a suction gas to generate a scavenging gas, a scavenging port provided in the cylinder and for supplying the scavenging gas from the supercharger into a combustion chamber that is a space enclosed by the cylinder and an upper surface of the piston, an exhaust port provided in the cylinder and for exhausting gas within the combustion chamber out of the combustion chamber, an exhaust gas recirculation part for extracting part of the exhaust gas exhausted from the combustion chamber as EGR gas and circulating the EGR gas into the suction gas or the scavenging gas, and an ejection part for ejecting liquid ammonia into the EGR gas within the exhaust gas recirculation part. It is thus possible to reduce the amount of nitrogen oxide by recirculation of the exhaust gas and to facilitate cooling that is necessary for circulating the EGR gas.

It is preferable that the supercharger includes a turbine that is caused to rotate by the exhaust gas exhausted from the combustion chamber, and a compressor for pressurizing the suction gas, using the rotation of the turbine as power, and that the exhaust gas recirculation part extracts part of the exhaust gas that has passed through the turbine as the EGR gas.

In a more preferable two-stroke engine, the EGR gas is circulated into the suction gas or the scavenging gas without needing to be cooled by a cooling medium.

It is preferable that the two-stroke engine further includes a fuel supply part for supplying fuel to the combustion chamber, and the fuel contains liquid ammonia.

More preferably, the two-stroke engine is a marine engine, and the exhaust gas exhausted from the combustion chamber is circulated into ambient air without needing to remove sulfur content with a scrubber.

A preferable four-stroke engine according to the present invention includes a cylinder, a piston provided in the cylinder, a supercharger for pressurizing a suction gas to generate an intake gas, an intake port provided in the cylinder and for supplying the intake gas from the supercharger into a combustion chamber in an intake stroke, the combustion chamber being a space enclosed by the cylinder and an upper surface of the piston, an exhaust port provided in the cylinder and for exhausting gas within the combustion chamber out of the combustion chamber in an exhaust stroke performed after an expansion stroke in which the gas within the combustion chamber burns, an exhaust gas recirculation part for extracting part of the exhaust gas exhausted from the combustion chamber as EGR gas and circulating the EGR gas into the suction gas or the intake gas, and an ejection part for ejecting liquid ammonia into the EGR gas within the exhaust gas recirculation part. It is thus possible to reduce the amount of nitrogen oxide by recirculation of the exhaust gas and to facilitate cooling that is necessary for circulating the EGR gas.

These and other objects, features, aspects and advantages of the present invention will become more apparent from the following detailed description of the present invention when taken in conjunction with the accompanying drawings.

DESCRIPTION OF EMBODIMENTS

Figure 1:
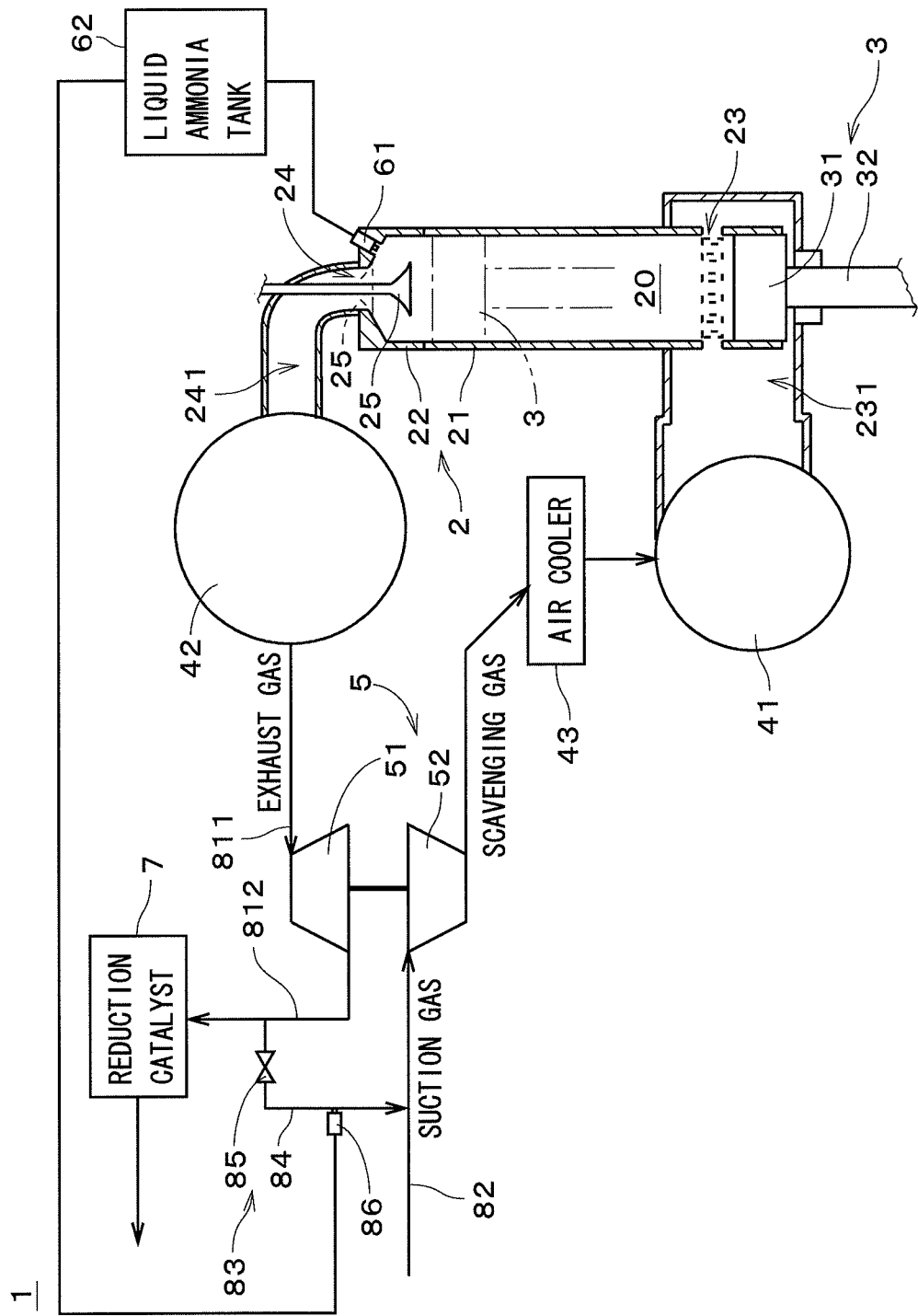
FIG. 1 illustrates a configuration of a two-stroke engine according to a first embodiment.

FIG. 1 illustrates a configuration of a two-stroke engine 1 according to a first embodiment of the present invention. The two-stroke engine 1 in FIG. 1 is a marine internal combustion engine and uses ammonia ($NH_3$) as fuel. The two-stroke engine 1 includes a cylinder 2 and a piston 3 provided in the cylinder 2. The piston 3 is movable in the vertical direction in FIG. 1. Note that the vertical direction in FIG. 1 is not necessarily the direction of gravity.

The cylinder 2 has a cylindrical cylinder liner 21 and a cylinder cover 22 attached to the top of the cylinder liner 21. The piston 3 includes a thick disk-shaped piston crown 31 inserted in the cylinder liner 21, and a piston rod 32 having one end connected to the bottom surface of the piston crown 31. The other end of the piston rod 32 is connected to a crank mechanism not shown.

In the two-stroke engine 1, the space enclosed by the cylinder liner 21, the cylinder cover 22, an exhaust valve 25 (described later), and the upper surface of the piston crown 31 (i.e., the upper surface of the piston 3) forms a combustion chamber 20 for burning ammonia gas and air. The cylinder cover 22 is provided with a fuel supply part 61 for supplying fuel to the combustion chamber 20. In the present embodiment, liquid ammonia is used as fuel. The liquid ammonia is supplied from a liquid ammonia tank 62 to the fuel supply part 61, and the fuel supply part 61 ejects the liquid ammonia into the combustion chamber 20.

A large number of through holes are circumferentially arranged in the vicinity of a lower end portion of the cylinder liner 21, and a cluster of these through holes constitutes a scavenging port 23 for supplying a scavenging gas described later into the combustion chamber 20. A scavenging chamber 231 is provided around the scavenging port 23, and the scavenging port 23 communicates with a scavenging pipe 41 through the scavenging chamber 231.

The cylinder cover 22 has an exhaust port 24 for exhausting gas within the combustion chamber 20 out of the combustion chamber 20. The exhaust port 24 is provided with an exhaust valve 25 that opens and closes the exhaust port 24. The gas exhausted out of the combustion chamber 20 through the exhaust port 24 (hereinafter, "exhaust gas") is guided through a first exhaust path 241 to an exhaust pipe 42. The actual two-stroke engine 1 includes a plurality of cylinders 2, and the cylinders 2 are connected to a single scavenging pipe 41 and a single exhaust pipe 42.

The two-stroke engine 1 further includes a supercharger 5 that is a turbocharger and an air cooler 43 that cools air supplied from the supercharger 5 with a cooling medium such as sea water. The supercharger 5 includes a turbine 51 and a compressor 52. The turbine 51 is rotated by the exhaust gas fed from the exhaust pipe 42 through a second exhaust path 811. The compressor 52 uses rotary power generated by the turbine 51 (i.e., uses the rotation of the turbine 51 as power) to pressurize and compress a suction gas (air) taken in from outside of the two-stroke engine 1 through a suction path 82. The pressurized air (hereinafter, "scavenging gas") is cooled by the air cooler 43 and is then supplied into the scavenging pipe 41. In this way, the supercharger 5 generates the scavenging gas by pressurizing the suction gas using the exhaust gas.

The exhaust gas used to rotate the turbine 51 passes through a third exhaust path 812 and is exhausted out of the two-stroke engine 1 via a reduction catalyst 7 for reducing nitrogen oxide ($NO_x$). As mentioned above, ammonia ($NH_3$) is used as the fuel of the two-stroke engine 1 and there is no sulfur content in the fuel. The exhaust gas is thus circulated into ambient air (i.e., exhausted) without needing to remove sulfur content with a scrubber. It is therefore possible to simplify the structure of the ship including the two-stroke engine 1.

The two-stroke engine 1 further includes an exhaust gas recirculation part 83 for extracting part of the exhaust gas exhausted out of the combustion chamber 20 as an EGR gas (i.e., exhaust gas for recirculation). The exhaust gas recirculation part 83 includes a recirculation flow path 84 that branches from the third exhaust path 812 at a position between the turbine 51 and the reduction catalyst 7 and is connected to the suction path 82, and a recirculation valve 85 provided on the recirculation flow path 84. The recirculation flow path 84 allows part of the exhaust gas that has passed through the turbine 51 to be extracted as the EGR gas and circulated into the suction gas in the suction path 82. The amount of the EGR gas to be circulated from the recirculation flow path 84 into the suction gas in the suction path 82 is adjusted by controlling the recirculation valve 85.

The two-stroke engine 1 includes an ejection part 86 (hereinafter, "ammonia ejection part 86") for ejecting liquid ammonia toward the EGR gas in the recirculation flow path 84. The ammonia ejection part 86 is connected to the liquid ammonia tank 62. The liquid ammonia ejected into the recirculation flow path 84 immediately vaporizes and accordingly the high-temperature EGR gas in the recirculation flow path 84 is cooled by the heat of vaporization (latent heat of vaporization) of the liquid ammonia. This facilitates circulation of the EGR gas into the suction gas. The compressor 52 pressurizes the suction gas containing the EGR gas and the ammonia for cooling to generate a scavenging gas. As described above, the scavenging gas is cooled by the air cooler 43 and is then supplied to the combustion chamber 20 through the scavenging pipe 41, the scavenging chamber 231, and the scavenging port 23.

Next is a description of operations of the two-stroke engine 1. In the two-stroke engine 1 illustrated in FIG. 1, the position of the piston 3 indicated by dashed double-dotted lines is the top dead center, and the position of the piston 3 indicated by solid lines is the bottom dead center. When the piston 3 is positioned in the vicinity of the top dead center, the exhaust valve 25 moves upward as indicated by the dashed double-dotted lines in FIG. 1 so that the exhaust port 24 is closed and the scavenging gas within the combustion chamber 20 is compressed.

Then, liquid ammonia is ejected from the fuel supply part 61 into the combustion chamber 20, and vaporized ammonia ignites spontaneously, causing combustion (expansion) of the gas (i.e., ammonia gas and scavenging gas) within the combustion chamber 20. This causes the piston 3 to be pushed down toward the bottom dead center. Note that the gas within the combustion chamber 20 does not necessarily have to ignite spontaneously, and the ignition of the gas within the combustion chamber 20 may be caused by a spark plug or the like.

After the combustion of the gas within the combustion chamber 20, the exhaust valve 25 moves downward to open the exhaust port 24 before the piston 3 reaches the bottom dead center. This starts exhaust of burnt gas within the combustion chamber 20. The gas exhausted out of the combustion chamber 20 (e.g., "exhaust gas") is fed to the turbine 51 of the supercharger 5 through the first exhaust path 241, the exhaust pipe 42, and the second exhaust path 811, as described previously. Part of the exhaust gas that has passed through the turbine 51 is extracted as the EGR gas by the exhaust gas recirculation part 83, is cooled with the liquid ammonia ejected from the ammonia ejection part 86, and is then circulated into the suction gas in the suction path 82. The exhaust gas from which the EGR gas has been extracted is exhausted out of the two-stroke engine 1 after passing through the reduction catalyst 7. In the two-stroke engine 1, a cam mechanism connected to a crank shaft of a crank mechanism causes the exhaust valve 25 to move up and down (i.e., causes the exhaust port 24 to be opened or closed).

When the piston 3 has moved to the vicinity of the bottom dead center and the upper surface of the piston crown 31 is positioned below the scavenging port 23, the combustion chamber 20 communicates with the scavenging chamber 231 (i.e., the scavenging port 23 is opened) and the supply of the scavenging gas within the scavenging chamber 231 into the combustion chamber 20 is started. After having passed through the bottom dead center, the piston 3 changes to move upward, and when the upper surface of the piston crown 31 reaches above the scavenging port 24, the supply of the scavenging gas into the combustion chamber 20 is stopped. Then, the exhaust port 24 is closed with the exhaust valve 25, and the combustion chamber 20 is sealed.

The piston 3 further moves upward so that the scavenging gas within the combustion chamber 20 is compressed, and when the piston 3 reaches in the vicinity of the top dead center, the fuel supply part 61 ejects liquid ammonia into the combustion chamber 20, causing combustion in the combustion chamber 20. The two-stroke engine 1 repeats the above-described operations.

In the two-stroke engine 1, as described above, the scavenging gas within the combustion chamber 20 contains part of the exhaust gas circulated into the suction gas as the EGR gas. This recirculation of the exhaust gas reduces the combustion temperature in the combustion chamber 20 and suppresses generation of nitrogen oxide. As a result, the amount of nitrogen oxide exhausted from the two-stroke engine 1 into the ambient air can be reduced.

Also, the ejection of liquid ammonia from the ammonia ejection part 86 toward the EGR gas in the recirculation flow path 84 facilitates cooling of the EGR gas, which is necessary for circulating the EGR gas into the suction gas. It is thus possible to circulate the EGR gas into the suction gas without providing an EGR cooler for cooling the EGR gas in the recirculation flow path 84. In other words, the EGR gas can be circulated into the suction gas without needing to be cooled by a cooling medium (i.e., a heating medium for reducing the temperature of the EGR gas). Consequently, it is possible to simplify the exhaust gas recirculation structure of the two-stroke engine 1 and to improve the degree of freedom in disposing devices in the engine room.

In the two-stroke engine 1, the exhaust gas recirculation part 83 extracts part of the exhaust gas that has passed through the turbine 51 as the EGR gas. Thus, the temperature and pressure of the exhaust gas from the combustion chamber 20 can be more efficiently used to rotate the turbine 51 than in the case of extracting part of the exhaust gas before passing through the turbine 51 as the EGR gas. In addition, the EGR gas is cooled with the liquid ammonia that is the same as the fuel. This allows commonality of some structures, such as pipes and a reservoir tank, for recirculation of exhaust gas and fuel supply. As a result, the structure of the two-stroke engine 1 can be simplified. The ammonia used to cool the EGR gas is further supplied as part of the scavenging gas to the combustion chamber 20. It is thus possible to reduce the amount of liquid ammonia supplied from the fuel supply part 61 to the combustion chamber 20.

Figure 2:
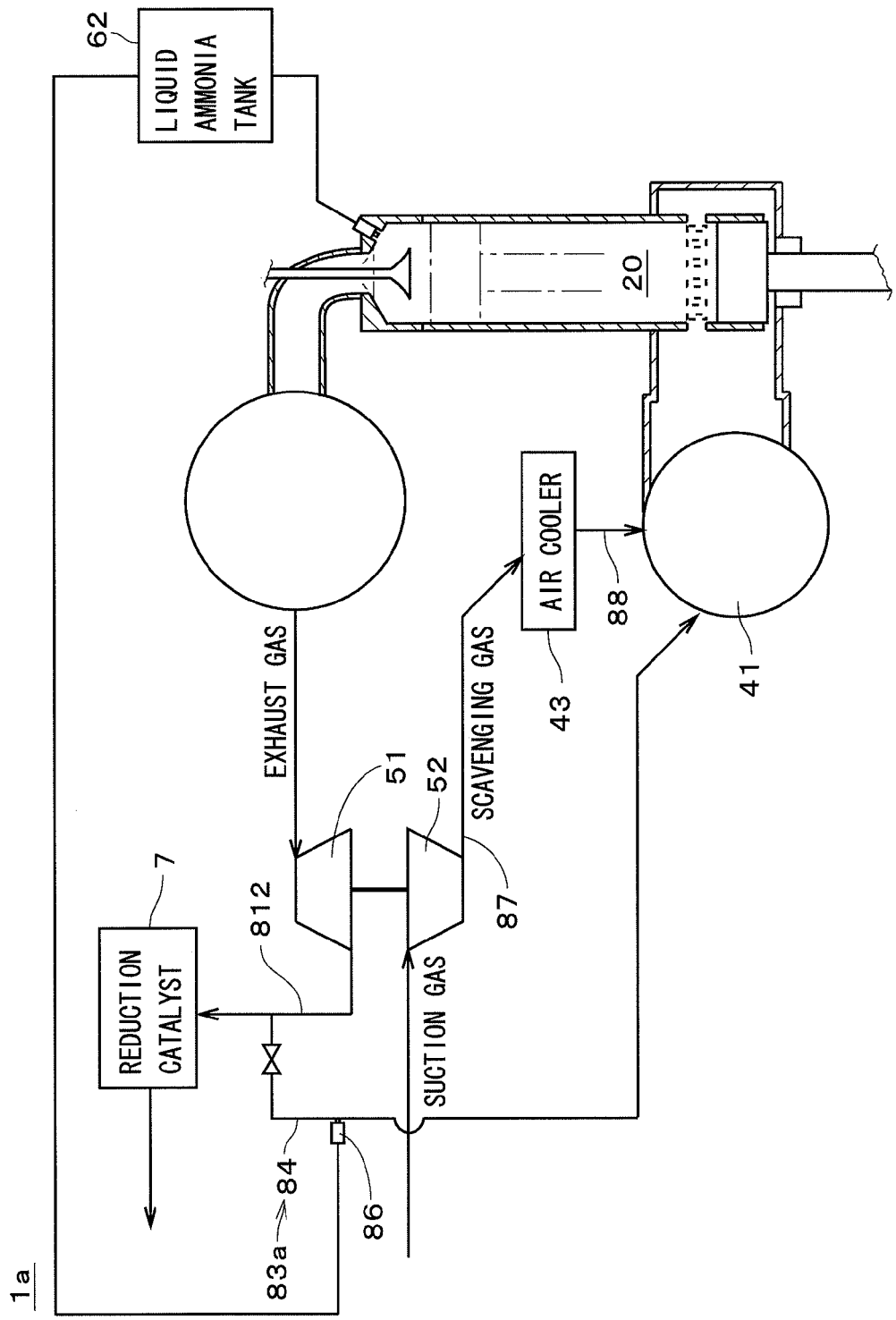
FIG. 2 illustrates another exemplary configuration of the two-stroke engine.

FIG. 2 illustrates another exemplary configuration of the two-stroke engine. A two-stroke engine 1a in FIG. 2 is similar to the two-stroke engine 1 illustrated in FIG. 1, with the exception that an exhaust gas recirculation part 83a circulates the EGR gas into the scavenging gas. Thus, constituent elements that are the same as those in FIG. 1 are denoted by the same reference numerals.

In the exhaust gas recirculation part 83a, the recirculation flow path 84 branches from the third exhaust path 812 at a position between the turbine 51 and the reduction catalyst 7 and is connected to the scavenging pipe 41. In the two-stroke engine 1a, similarly to the two-stroke engine 1 in FIG. 1, the liquid ammonia supplied from the liquid ammonia tank 62 to the ammonia ejection part 86 is ejected toward the ERG gas in the recirculation flow path 84 and vaporizes. This facilitates cooling of the high-temperature EGR gas and recirculation of the EGR gas into the scavenging gas in the scavenging pipe 41. By supplying the scavenging gas to the combustion chamber 20, the combustion temperature in the combustion chamber 20 is reduced and generation of nitrogen oxide is suppressed. As a result, the amount of nitrogen oxide exhausted from the two-stroke engine 1a into the ambient air can be reduced.

In the two-stroke engine 1a, a mechanism such as a compressor for pressurizing the EGR gas may be provided in the recirculation flow path 84 in order to further facilitate the recirculation of the EGR gas into the scavenging gas. Alternatively, the recirculation flow path 84 may be connected not to the scavenging pipe 41 but to a first scavenging path 87 that connects the compressor 52 and the air cooler 43 or a second scavenging path 88 that connects the air cooler 43 and the scavenging pipe 41. In this case, the EGR gas is circulated into the scavenging gas in the first scavenging path 87 or the second scavenging path 88.

Figure 3:
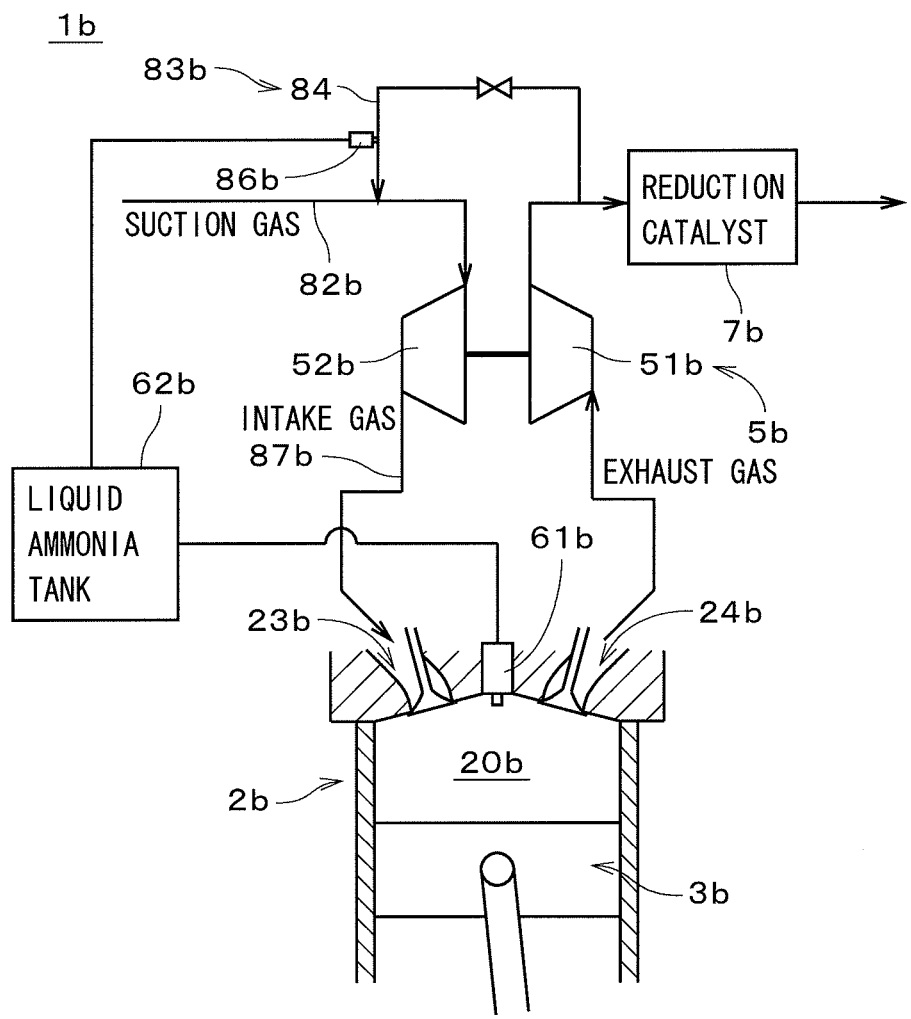
FIG. 3 illustrates a configuration of a four-stroke engine according to a second embodiment.

Next is a description of a four-stroke engine according to a second embodiment of the present invention. FIG. 3 illustrates a configuration of a four-stroke engine 1b according to the second embodiment. The four-stroke engine 1b includes a cylinder 2b, a piston 3b provided in the cylinder 2b, an intake port 23b and an exhaust port 24b that are formed in the cylinder 2b, a supercharger 5b for pressurizing a suction gas to generate an intake gas, a fuel supply part 61b for supplying fuel into the cylinder 2b, an exhaust gas recirculation part 83b for circulating an EGR gas into the suction gas, and an ammonia ejection part 86b for ejecting liquid ammonia toward the EGR gas within the exhaust gas recirculation part 83b. The fuel supply part 61b is connected to a liquid ammonia tank 62b and ejects liquid ammonia as fuel into a combustion chamber 20b, which is a space enclosed by the cylinder 2b and the upper surface of the piston 3b. The ammonia ejection part 86b is also connected to the liquid ammonia tank 62b.

In the four-stroke engine 1b, the intake gas from the supercharger 5b is supplied into the combustion chamber 20b by opening a valve provided in the intake port 23b in an intake stroke in which the piston 3b moves from the top dead center to the bottom dead center. Then, a compression stroke is performed with the intake port 23b closed in which the intake gas within the combustion chamber 20b is compressed by the piston 3b moving from the bottom dead center to the top dead center.

Then, when the piston 3b is positioned in the vicinity of the top dead center, liquid ammonia is ejected from the fuel supply part 61b into the combustion chamber 20b, causing combustion (expansion) of gas in the combustion chamber 20b. After an expansion stroke in which the piston 3b moves from the top dead center to the bottom dead center due to the combustion of gas in the combustion chamber 20b, an exhaust stroke is performed in which the piston 3b moves from the bottom dead center to the top dead center. In the exhaust stroke, the gas within the combustion chamber 20b is exhausted out of the combustion chamber 20b by opening a valve provided in the exhaust port 24b.

The exhaust gas exhausted from the combustion chamber 20b is fed to the turbine 51b of the supercharger 5b. Part of the exhaust gas that has passed through the turbine 51b is extracted as an EGR gas by the exhaust gas recirculation part 83b, is cooled in the recirculation flow path 84b with the liquid ammonia ejected from the ammonia ejection part 86b, and is then circulated into the suction gas in the suction path 82b. The exhaust gas from which the EGR gas has been extracted is exhausted out of the four-stroke engine 1b through a reduction catalyst 7b.

In the four-stroke engine 1b, the suction gas into which the EGR gas has been circulated is pressurized by the compressor 52b of the supercharger 5b to generate an intake gas, and the intake gas is supplied to the combustion chamber 20b in the aforementioned intake stroke. This recirculation of the exhaust gas reduces the combustion temperature in the combustion chamber 20 and suppresses generation of nitrogen oxide. As a result, the amount of nitrogen oxide exhausted from the four-stroke engine 1b into the ambient air can be reduced.

In addition, the ejection of the liquid ammonia from the ammonia ejection part 86b toward the EGR gas in the recirculation flow path 84b facilitates cooling of the EGR gas, which is necessary for circulating the EGR gas into the suction gas. Thus, the EGR gas can be circulated into the suction gas without needing to be cooled by a cooling medium. As a result, it is possible to simplify the exhaust gas recirculation structure of the four-stroke engine 1b and to improve the degree of freedom in disposing devices in the engine room.

In the four-stroke engine 1b, the exhaust gas recirculation part 83b extracts part of the exhaust gas that has passed through the turbine 51b as the EGR gas. Thus, the temperature and pressure of the exhaust gas from the combustion chamber 20b can be more efficiently used to rotate the turbine 51b than in the case of extracting part of the exhaust gas before passing through the turbine 51b as the EGR gas. In addition, the EGR gas is cooled with the liquid ammonia that is the same as the fuel. This allows commonality of some structures, such as pipes and a reservoir tank, for recirculation of exhaust gas and fuel supply. As a result, the structure of the four-stroke engine 1b can be simplified. The ammonia used to cool the EGR gas is supplied as part of the intake gas to the combustion chamber 20b. It is thus also possible to reduce the amount of liquid ammonia supplied from the fuel supply part 61b to the combustion chamber 20b.

In the four-stroke engine 1b, the EGR gas may be circulated into the intake gas by connecting the exhaust gas recirculation part 83b to an intake path 87b that connects the compressor 52b and the combustion chamber 20b. In this case as well, the recirculation of the exhaust gas can reduce the amount of nitrogen oxide exhausted and facilitate cooling of the EGR gas using the ammonia ejection part 86b.

While the above has been a description of embodiments of the present invention, the present invention is not intended to be limited to the above-described embodiments and can be modified in various ways.

For example, the fuel supply part 61 of the two-stroke engine 1 may supply, as fuel, a mixture of liquid ammonia and petroleum fuel or the like, instead of supplying only liquid ammonia. In this case as well, the EGR gas is cooled with the liquid ammonia contained in the fuel supplied from the fuel supply part 61. This allows commonality of some structures, such as pipes and a reservoir tank, for recirculation of exhaust gas or fuel supply. As a result, the structure of the two-stroke engine 1 can be simplified. The ammonia used to cool the EGR gas is also supplied as part of the scavenging gas to the combustion chamber 20. Thus, the amount of fuel supplied to the combustion chamber 20 can also be reduced. The same applies to the two-stroke engine 1a and the four-stroke engine 1b. In the engines according to the above-described embodiments, fuel that contains no ammonia (e.g., hydrogen gas or light oil) may be supplied from the fuel supply part to the combustion chamber.

In the two-stroke engines 1 and 1a, if further cooling of the EGR gas in the recirculation flow path 84 is necessary, an EGR cooler for cooling the EGR gas with a cooling medium may be provided in the circulation flow path 84. The EGR cooler can be more compact than in the case of not cooling the EGR gas with the liquid ammonia from the ammonia ejection part 86. The same applies to the four-stroke engine 1b.

In the engines according to the above-described embodiments, part of the exhaust gas that has passed through the reduction catalyst may be extracted as the EGR gas. As another alternative, part of the exhaust gas before passing through the turbine of the supercharger may be extracted as the EGR gas, or part of both the exhaust gas before passing through the turbine and the exhaust gas that has passed through the turbine may be extracted as the EGR gas. The supercharger may be configured to pressurize a suction gas using power obtained from a crank shaft, other than pressurizing the suction gas using the exhaust gas from the combustion chamber.

The two-stroke engines and the four-stroke engine according to the above-described embodiments may be used in various applications aside from marine applications, such as in automobiles or in prime motors for electric power generation.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST 1, 1a Two-stroke engine
1b Four-stroke engine
2, 2b Cylinder
3, 3b Piston
5, 5b Supercharger
20, 20b Combustion chamber
23 Scavenging port
23b Intake port
24, 24b Exhaust port
51, 51b Turbine
52, 52b Compressor
61, 61b Fuel supply part
83, 83a, 83b Exhaust gas recirculation part
86, 86b Ammonia ejection part

The invention claimed is:

1. A two-stroke engine comprising:
a cylinder;
a piston provided in said cylinder;
a supercharger for pressurizing a suction gas to generate a scavenging gas;
wherein said supercharger includes:
 a turbine that is rotated by the exhaust gas exhausted from said combustion chamber; and
 a compressor for pressurizing said suction gas, using the rotation of said turbine as power;
a scavenging port provided in said cylinder and for supplying said scavenging gas from said supercharger into a combustion chamber that is a space enclosed by said cylinder and an upper surface of said piston;
an exhaust port provided in said cylinder for exhausting gas out of said combustion chamber;
an exhaust gas recirculation part for extracting part of the exhaust gas exhausted from said combustion chamber that has passed through said turbine as EGR gas and circulating said EGR gas into said suction gas or said scavenging gas;

an ammonia injector for injecting liquid ammonia into said EGR gas within said exhaust gas recirculation part.

2. The two-stroke engine according to claim 1, wherein said EGR gas is circulated into said suction gas or said scavenging gas without needing to be cooled by a cooling medium.

3. The two-stroke engine according to claim 2, further comprising:
a fuel injector for supplying fuel to said combustion chamber,
wherein said fuel contains liquid ammonia.

4. The two-stroke engine according to claim 3, wherein said two-stroke engine is a marine engine, and
the exhaust gas exhausted from said combustion chamber is circulated into ambient air without needing to remove sulfur content with a scrubber.

5. The two-stroke engine according to claim 1, wherein said EGR gas is circulated into said suction gas or said scavenging gas without needing to be cooled by a cooling medium.

6. The two-stroke engine according to claim 5, further comprising:
a fuel injector for supplying fuel to said combustion chamber,
wherein said fuel contains liquid ammonia.

7. The two-stroke engine according to claim 6, wherein said two-stroke engine is a marine engine, and
the exhaust gas exhausted from said combustion chamber is circulated into ambient air without needing to remove sulfur content with a scrubber.

8. The two-stroke engine according to claim 1, further comprising:
a fuel injector for supplying fuel to said combustion chamber,
wherein said fuel contains liquid ammonia.

9. The two-stroke engine according to claim 8, wherein said two-stroke engine is a marine engine, and
the exhaust gas exhausted from said combustion chamber is circulated into ambient air without needing to remove sulfur content with a scrubber.

10. A four-stroke engine comprising:
a cylinder;
a piston provided in said cylinder;
a supercharger for pressurizing a suction gas to generate an intake gas;
wherein said supercharger includes:
a turbine that is rotated by the exhaust gas exhausted from said combustion chamber; and
a compressor for pressurizing said suction gas, using the rotation of said turbine as power;
an intake port provided in said cylinder and for supplying said intake gas from said supercharger into a combustion chamber in an intake stroke, said combustion chamber being a space enclosed by said cylinder and an upper surface of said piston;
an exhaust port provided in said cylinder for exhausting gas out of said combustion chamber in an exhaust stroke performed after an expansion stroke in which the gas within said combustion chamber burns;
an exhaust gas recirculation part for extracting part of the exhaust gas exhausted from said combustion chamber that has passed through said turbine as EGR gas and circulating said EGR gas into said suction gas or said intake gas; and
an ammonia injector for injecting liquid ammonia into said EGR gas within said exhaust gas recirculation part.

\* \* \* \* \*